Jan. 3, 1939.   F. R. McCRUDDEN   2,142,363

LOCK WASHER ASSEMBLY MEANS

Filed Oct. 28, 1937

INVENTOR
Frederick R. McCrudden
BY
A. D. T. Libby
ATTORNEY

Patented Jan. 3, 1939

2,142,363

UNITED STATES PATENT OFFICE 2,142,363

LOCK WASHER ASSEMBLY MEANS

Frederick Robert McCrudden, Bloomfield, N. J., assignor to The National Lock Washer Company, Newark, N. J.

Application October 28, 1937, Serial No. 171,415

3 Claims. (Cl. 151—38)

This invention relates to means for holding a split spring washer on a screw stud. In some cases, for the purpose of convenience in handling an assembly, it is desirable to have a lock washer which can be assembled on a screw stud and stay on the stud without falling off and without interfering with the application of the stud to a structure to which it is to be applied.

It is the object of my invention to provide a split spring washer which can be applied to a screw stud so that the two may be handled as a unit and without any interference with the drawing up of the screw stud into the structure to which it is to be applied.

My invention will be clear from a reading of the specification taken in connection with the annexed drawing, wherein.

Figure 1:
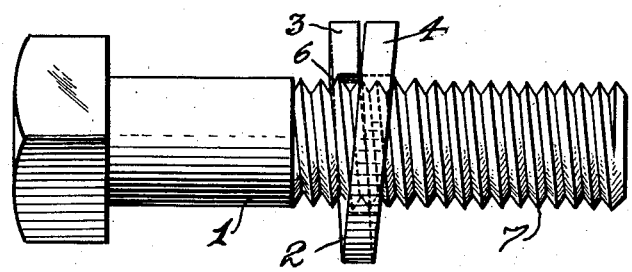
Figure 1 is a plan view of one form of my improvement, the drawing indicating a device twice the size of the model from which the figure was made.
Figure 2:
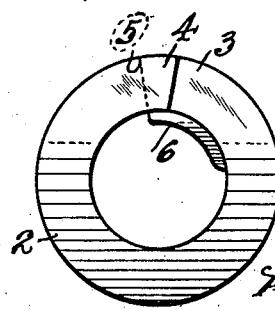
Figure 2 is a view on the same scale, of the lock washer shown in Figure 1.

In Figures 1 and 2, a screw stud 1 is shown with threads on only part of its length. On the threaded portion is mounted a split spring washer 2, the ends 3 and 4 of which overlap, as indicated by the dotted line 5 in Figure 2. One of the ends, for example 3, has the material within the inner peripheral surface of the washer punched or sheared so as to form a sort of wing or flange 6. The formation 6 as made is what I would term relatively slender and projects inwardly only a slight distance beyond the inner circle or boundary of the washer, to engage the threads 7 of the stud 1 just sufficiently to hold the washer onto the threaded portion 7 of the stud after it has been turned thereon, which is done very easily because of the extremely loose fit. The formation 6 is of such a slender character that in screwing the stud 1 into a threaded hole, the formation is readily bent over or broken off when the washer 2 engages the unthreaded portion of the stud so that substantially no interference is encountered, due to the washer, in screwing the stud into the threaded hole which receives it.

Figure 4:
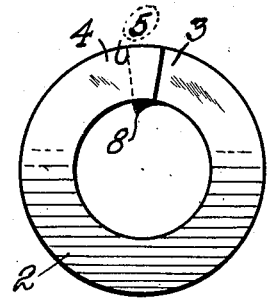
Figure 4 is a view on the same scale of the washer shown in Figure 3.
Figure 3:
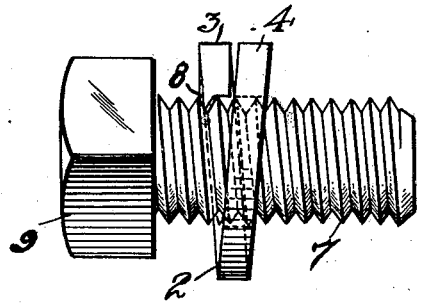
Figure 3 shows a further modified form of my invention, the view being twice the size of the actual device from which the figure was made.

In Figures 3 and 4, a slightly different formation is provided which comprises a slight burr 8 thrown on the inside face or inner periphery of the washer on one of the split ends where the material is free to be operated on. As shown in Figure 3 the washer 2 is held to the stud 9, which is threaded all the way up to the head, by the slight projection 8, which, when the washer is used with the partially threaded stud of Figure 1, is readily bent over or broken off when the screw stud is being set up into the threaded hole to receive it.

The arrangements described are not to be confused with lock washers which have sturdy projections formed thereon for the purpose of gripping into the bolt or stud when the same is turned, or a nut is turned up against the washer, for it will appear from what has been said that my improvement is directed to a different problem, and the washers are constructed in a different manner.

While I have indicated the special slender formation as being at the split end of the washer, where I found it preferable to make it, it may be located at some other point within the inner periphery of the washer.

What I claim is:

1. For application only under a nut or directly over the head of a screw stud; a split spring washer having means for automatically holding itself onto a screw stud when applied thereto, said means comprising a slender breakable formation on the inner peripheral surface of the washer at one corner of the split, the formation projecting inwardly slightly beyond the inner circular boundary of the washer so as to run between the threads of a stud to which the washer is adapted for use, but without interfering with the use of the stud or requiring any adjustment of the washer thereon.

2. A split spring washer as defined in claim 1, further characterized in that the formation is in the nature of an edged, readily collapsible, partial flange.

3. A split spring washer as defined in claim 1, further characterized in that the formation is in the nature of a pointed burr which is readily broken off as described.

FREDERICK ROBERT McCRUDDEN.